United States Patent Office 3,558,332
Patented Jan. 26, 1971

3,558,332
LOW FIRING PHOSPHATE-BONDED ALUMINA DIELECTRIC HAVING IMPROVED ADHESION TO METAL
Relva C. Buchanan, Poughkeepsie, N.Y., assignor to International Business Machines Corporation, Armonk, N.Y., a corporation of New York
No Drawing. Filed June 17, 1968, Ser. No. 737,342
Int. Cl. C04b 33/00
U.S. Cl. 106—39                5 Claims

ABSTRACT OF THE DISCLOSURE

An alumina dielectric of fine grained structure and high tensile strength containing from about 2% to about 12% by weight of a glassy phase which bonds the finely divided alumina grains together, the glassy phase containing at least 1% calcium phosphate and one or more flux additives, consisting of lithium silicate, zinc silicate, calcium silicate or magnesium silicate in an amount equal to the calcium phosphate and formed through reactive sintering at from about 1350° C. up to 1460° C. which is 50–200° less than that of alumina per se (1550° C.). The dielectric which adheres to noble metals is characterized by high electrical volume resistivity of $10^{12}$–$10^{14}$ ohm-cm., low dissipation factor, low thermal expansion from 65 to 67.6 in./in. ° C. and high density from 3.40 to 3.86 gm./cu. cc. The shrinkage of the preferred embodiments is about 17.0–18.0% in comparison with a shrinkage 18.5% for alumina to which no flux is added. Surface roughness values as low as 2 to 4 microinches are achieved.

---

This invention relates to an alumina dielectric of fine grained structure and high tensile strength containing from about 2% to about 12% of a glassy phase which bonds the finely divided alumina grains, the glassy phase formed containing at least 1% calcium phosphate and one or more flux additives mixed with said phosphate, consisting of lithium silicate, zinc silicate, calcium silicate or magnesium silicate in an amount equal to the calcium phosphate, the glassy phase being formed through reactive sintering at from about 1350° C. up to 1460° C. This sintering temperature is 50–200° less than that of alumina per se.

The dielectric is characterized by high electrical volume resistivity in the range of $10^{12}$–$10^{14}$ ohm-cm., low dissipation factor, low thermal expansion from 65 to 67.6 in./in. ° C. and high density from 3.40 to 3.86 gm./cu. cc. The preferred glassy phase is obtained by the addition of about 5% of lithium silicate or zinc silicate to about 5% of calcium metaphosphate to provide 10% of flux. The minimum firing temperatures of 1350° C. and 1420° C. are for the two preferred combinations of calcium phosphate-lithium silicate and calcium phosphate-zinc silicate, respectively, and each is substantially lower than the firing temperature of 1550° C. for pure alumina. The shrinkage of the preferred embodiments is about 17.0–18.0% at the optimum sintering temperature in comparison with a shrinkage of at best 18.5% for the alumina to which no flux is added. The flexural strength decreases with increasing flux content.

An unexpected and beneficial property of the low firing dielectric composition is its minimal surface roughness, the surface roughness ordinarily increasing with increased flux content. Surface roughness values as low as 4 to 6 microinches are achieved in films having less shrinkage than pure alumina and only slightly higher porosity than pure alumina, e.g. 3–5% greater.

An advantage of the invention lies in the improved adhesion of the dielectric to metals and to alloys used as conductors, whether these metals are deposited under vacuum by decomposition of organic metal compounds or by hydrogen reduction of metal compounds or by liquid painting or by laminating preformed metal and metal alloy conductor sheets. The metals or alloys are generally co-fired with the alumina dielectric composition at temperatures below the reactive sintering temperature of pure alumina.

An example of an alloy of manganese, germanium and palladium or rhodium which has magnetic characteristics is described in Blither, Jr., U.S. Pat. No. 3,279,914. This magnetic alloy provides useful microelectronic components when deposited upon an alumina support. However, temperatures near the sintering temperature of alumina (1550° C.) cause melting of the alloy and seriously impair the magnetic characteristics which are desired. This disadvantage is overcome with the low firing alumina dielectric of the present invention.

It is a unique advantage of the preferred composition that the dielectric based upon lithium silicate addition or zinc silicate addition, each with calcium metaphosphate, provides improved adhesion characteristics. The advantages in dimensional stability in the preferred composition is unexpected since it is known that additions of alkali metal silicate to alumina create porosity and loss of dimensional stability during firing and co-firing procedures involving the embedding of refractory elements. Further, the lithium oxide additions generally lower electrical resistance. For example, Carson U.S. Pat. No. 3,051,895 shows the very substantial reduction in electrical resistance through the addition of up to 10 atomic percent of lithium oxide in an aluminum-oxide-calcium oxide-nickel oxide medium. This reduction is not observed in the preferred ceramics of the invention. Also, Smith et al. U.S. Pat. No. 2,474,440 shows a high degree of porosity resulting from lithium oxide addition to alumina.

Although the substantial absence of porosity in the present superior, ceramic dielectric product is not completely understood, it is believed that the high resistivity and low porosity characteristics with no increase in shrinkage are due to the absence of any sodium oxide, such as is present in clay which is a common flux used to lower the melting point of alumina ceramics. Low-soda, calcined alumina is commercially available in very finely divided form with a maximum of 0.13% $Na_2O$. Alkali and silica addition, e.g., sodium oxide and $SiO_2$, are known to lower the density, as shown in Malley et al. U.S. Pat. No. 2,980,632, and alkali metal silicates in the form of clay are known to create substantial shrinkage, as in McKinley et al. U.S. Pat. No. 2,019,618. A significant aspect of the invention is the use of low-soda alumina. The low-soda alumina which is used in the present invention has a particle size between about 0.1 and about 0.8 micron.

The invention will be more clearly understood by the following specific examples.

EXAMPLE 1

| Raw material: | Commercial source |
|---|---|
| Alumina ($Al_2O_3$) | Alcoa XA–16 or Reynolds ERC–X, both being *low soda* content. |
| Calcium metaphosphate ($CA(PO_3)_2$). | Reagent grade chemical from laboratory supply house. |
| Zinc metasilicate ($ZnSiO_3$). | Laboratory supply house. |
| Lithium metasilicate ($Li_2SiO_3$). | Laboratory supply house. |

Alcoa XA–16 is described by the supplier, Alcoa Chemicals Division of the Aluminum Company of America, as being a low-soda alumina available in superground form wherein the extremely fine crystalline alumina particles with a median particle size of 0.1 micron develop fired densities above 3.90 grams per cc. at a temperature of 1500–1550° C.

The Reynolds ERC–X in finely ground form has a mean particle size of 0.8 micron and X-ray diffraction analysis shows alpha corundum crystallite size in the range of 1500–9000 angstrom units.

The chemical analysis of Alcoa XA–16 Superground and of the sample of Reynolds ERC–X which was analyzed by UV spectrographic and flame analysis are shown in the table below:

CHEMICAL ANALYSIS (PERCENT)

|  | Alcoa XA–16 Superground | Reynolds ERC-X |
|---|---|---|
| $Na_2O$ | 0.08 | 0.08 |
| $SiO_2$ | 0.05 | 0.07 |
| $CaO$ | 0.03 | 0.04 |
| $MgO$ | 0.05 | 0.03 |
| $Fe_2O_3$ | 0.01 | 0.02 |
| $MnO$ | 0.0015 | 0.001 |
| $B_2O_3$ | <0.001 | <0.001 |
| $Cr_2O_3$ | 0.0002 | <0.001 |

Conventional method of preparing ceramic slip on flexible film

The following are the conventional steps used in the present invention:

(a) Dry blending Composition A or B by ball milling for 30 minutes;

(b) Wet milling in the same ball mill by adding pure water, testing particle size and stopping wet milling when an average particle size of 0.5 micron is reached, then vacuum filtering and drying;

(c) Comminuting dried products from step (b) above and screening through −100 mesh to provide sifted powder for casting slip;

(d) Adding volatile binder consisting of solvent mixture of ethyl alcohol and toluene, dibutyl phthalate plasticizer, polyvinyl butyral resin and non-ionic wetting agent, such as alkyl phenyl ether of polyethylene glycol available as "Tergitol NPX," "Tergitol NP–N," "Tergitol NP–27" and the like from Union Carbide and Carbon Corporation, 30 E. 42nd St., New York, N.Y. 10017, the ratio of powder to binder being about 1.3 to 1.0;

(e) Milling the powder-binder mixture for about 15 hours to form a homogeneous suspension in the specific gravity range from 1.47–1.56 grams per cc. and at a viscosity of about 2900–3000 centipoises;

(f) Casting a slip onto a 5 mil thick Mylar film support to provide a film 48 inches long, 6 inches wide and .0058 inch thick from a pre-weighed slip containing from 90–115 grams, the thickness being "leveled" by a doctor blade;

(g) Drying the cast slip for four hours at room temperature, peeling the slip from the support, inspecting for pin holes and color change and then aging for 48 hours at room temperature to complete solvent evaporation, thereafter testing for green density value which must lie between 1.76 and 1.88;

(h) Cutting the slip into sheets about 6 inches by 2 inches and punching holes in the sheets for filling with ohmic contact metal in the form of electrode paste;

(i) Depositing electrode paste, a typical paste formula being either gold-platinum, platinum, palladium and the like in which case the subsequent firing step will be in air, or molybdenum, moly-manganese, tungsten and the like in which the subsequent firing step will be in a reducing atmosphere, and drying at 100° C. for 10 minutes;

(j) Stacking the green sheets to form the laminate consisting of from 4–6 sheets and placing into a press for laminating at 175° F. and 100–800 p.s.i. for 5–10 minutes, the pressure gradually increasing from 100–800 p.s.i. to prevent void formation and to form a monolithic body;

(k) Cutting monolithic body to module size 1 inch by 1 inch, inserting iron-nickel-cobalt alloy or silver alloy contact pins into the metallized contact holes; and, (l) Firing in air or a reducing atmosphere, depending on the paste used in (i) above, for 3–4 hours at a temperature of 1340° C.±20° C. for Composition A and at a temperature of 1420° C. plus or minus 20° C. for Composition B.

Proportions

| Composition A, percent: | Composition B, percent |
|---|---|
| 95.0 alumina | 95.0 alumina. |
| 2.5 lithium silicate | 2.5 zinc silicate. |
| 2.5 calcium phosphate | 2.5 calcium phosphate. |

The low sodium fired product, FB, which is obtained after firing Composition B at 1420° C., plus or minus 20°, for 3–4 hours is similar in desirable electrical, thermal and tensile strength properties to the fired product, FA, from Composition A. The dielectric constant is of the order of 9–10 and does not vary more than 10% over the range of temperatures from 0 to 1000° F. The adhesion of the ceramics FA and FB to noble metals, such as gold, silver, iridium, osmium, palladium, rhodium and ruthenium, and alloys of these, is excellent. The lower temperatures of firing Compositions A and B permit greater uniformity in electrical characteristics to be achieved during the bonding of thin layers of these ceramics to tantalum oxide, tantalum metal and to alloys of molybdenum-manganese, molybdenum-manganese-copper which are used as ohmic contacts, conductive patterns, signal planes, ground planes and the like in microelectronic packaging.

The low thermal coefficient of expansion of ceramic product FB, which is similar to that of ceramic product FA, renders the electrical product based upon these ceramics resistant to thermal shock and the resulting products are characterized by ruggedness and low cost. In comparison with high shrinkage, clay-containing ceramics, the preferred products FA and FB of the present invention are very low in porosity so as to resist high voltage breakdown and are also about the same density as alumina to permit small electronic packaging of capacitors and resistors. In a capacitor, the present dielectric can be made in a uniform film or layer thickness which varies by less than 4 to 8 microinches from the normal. This results in reproducibility of electrical characteristics which is uniquely achieved in the presence of a very small proportion of glassy phase as the sole binder for low soda, finely divided alumina, this glassy phase being free from the conventional borosilicate glass or sodium aluminosilicate glass.

EXAMPLE 2

The following table shows the results of tests in which the slips were prepared by the method of Example 1 above.

TABLE.—TYPICAL PROPERTY CHANGES WITH FLUX CONCENTRATION [a]
[50:50 Mixture of Calcium Phosphate and Lithium Silicate]

| Properties | Percent flux | | | | |
|---|---|---|---|---|---|
|  | 0 | 2 | 5 | 7.5 | 10 |
| Optimum range sintering temperature (° C.)[b] | 1,510–1,550 | 1,440–1,480 | 1,380–1,420 | 1,350–1,390 | 1,330–1,370 |
| Density (gm./cm.$^3$) | 3.86 | 3.80 | 3.66 | 3.59 | 3.40 |
| Shrinkage (percent) | 18.5 | 18.0 | 17.1 | 16.6 | 16.4 |
| Flexural strength (p.s.i. in thousands) | 79 | 68 | 60 | 55 | 52 |
| Dielectric constant | 9.2 | 9.1 | 8.9 | 8.5 | 8.2 |
| Volume resistivity (ohm-cm.) | $5 \times 10^{14}$ | $10^{14}$ | $10^{14}$ | $10^{14}$ | $10^{14}$ |
| Thermal expansion (in./in. ° C.) | 68.6 | 67.6 | 66.0 | 67.0 | 65.0 |

[a] The starting finely divided alumina is low soda, fine grained alumina (average grain size of 0.8 to 1.0 micron), such as Alcoa XA–16 and Reynolds ERC–X, which provides a flexural strength of 79,000 p.s.i. when sintered at 1,510–1,550 ° C. Successful runs have been made with particle sizes up to 5 microns.
[b] Firing in air for 3–4 hours. The optimum value is the middle of the range.

The foregoing procedure and compositions produce the most desirable electrical products, but good results are achieved when the proportion of lithium silicate or zinc silicate is increased up to about 9% with a corresponding decrease in the amount of calcium phosphate to about 1% at the expense of the alumina; in short, the minimum low soda alumina content is 88% and the maximum is about 98%. It is preferred that about equal quantities of zinc or lithium silicate, as the case may be, and calcium phosphate be used. About 1 to 2% of calcium silicate or magnesium silicate may be added as a third ingredient. The most desirable benefits of minimum sintering temperature with minimal shrinkage and without impairment of the desired mechanical or electrical characteristics are achieved in the so-blanced ternary compositions, the phosphate in molecular form $(Ca(PO_3)_2)$ balancing the silicate in molecular form $(Li_2SiO_3)$ or $(ZnSiO_3)$.

It is preferred to use thermoplastic synthetic organic film-forming materials as the binder. Some suitable binders of this type are polyvinyl chloride polymers, polyvinyl chlorideacetate copolymers, cellulose acetate polymers, nitrocellulose, polyester polymers, and cellulose acetate-butyrate polymers.

The film may be produced by extrusion, in which case a solvent is not required. Where some other film-forming process is used, a solvent which is compatible with the binder may be required. Some solvents which may be used with the polyvinyl binders are methyl ethyl ketone, toluene, and alcohol.

The use of a plasticizer for the binder and a defloculant for assisting in dispersing the ceramic dielectric composition and for adjusting the viscosity of the film formulation are optional. Where they are used, they are used in the combinations and in the quantities in which they are usually used in such systems.

What is claimed is:

1. An alumina dielectric of fine grained low-soda alumina and good adhesion to metal containing less than about 12% of a calcium phosphate glassy phase bonding the alumina grains together through reactive sintering, said dielectric being characterized by high electrical resistivity and low thermal expansion, the glassy phase obtained by the addition of about 1% to about 5% of calcium metaphosphate and one or more flux additives selected from the group consisting of lithium silicate, zinc silicate, calcium silicate and magnesium silicate in an amount equal to the calcium metaphosphate, to said low-soda alumina which has an $Na_2O$ content of less than 0.13%, a particle size between 0.5–5 microns and there being present at least 1% of calcium metaphosphate and other flux additive in said composition, the remainder being said alumina.

2. A dielectric as claimed in claim 1, wherein said low sodium alumina is present in an amount of 90–95%, said zinc silicate is present in an amount of 2 to 5% and said calcium metaphosphate is present in an amount of from 2% to 5%.

3. A dielectric as claimed in claim 1, wherein said low sodium alumina is present in an amount of 90–95%, said lithium silicate is present in an amount of 2% to 5% and said calcium metaphosphate is present in an amount of 2% to 5%.

4. A dielectric as claimed in claim 2 wherein there is present a third flux additive selected from the group consisting of calcium silicate and magnesium silicate in an amount of up to 2% by weight.

5. A dielectric as claimed in claim 3 wherein there is present a third flux additive selected from the group consisting of calcium silicate and magnesium silicate in an amount up to 2% by weight.

References Cited

UNITED STATES PATENTS

| | | | |
|---|---|---|---|
| 2,419,290 | 4/1947 | Schaefer | 106—46 |
| 2,469,211 | 5/1949 | Schwartzwalder et al. | 264—61X |
| 2,571,526 | 10/1951 | Bonnet | 106—62 |
| 3,106,452 | 10/1963 | Watson et al. | 106—65X |
| 3,262,754 | 7/1966 | Lindsay et al. | 106—65X |
| 3,457,091 | 7/1969 | Gupta | 106—39 |

TOBIAS E. LEVOW, Primary Examiner

W. R. SATTERFIELD, Assistant Examiner

U.S. Cl. X.R.

106—46, 62, 65; 264—61